March 24, 1970     T. A. ISMOND     3,502,172
SCAFFOLD VEHICLE
Filed Nov. 13, 1967     4 Sheets-Sheet 1
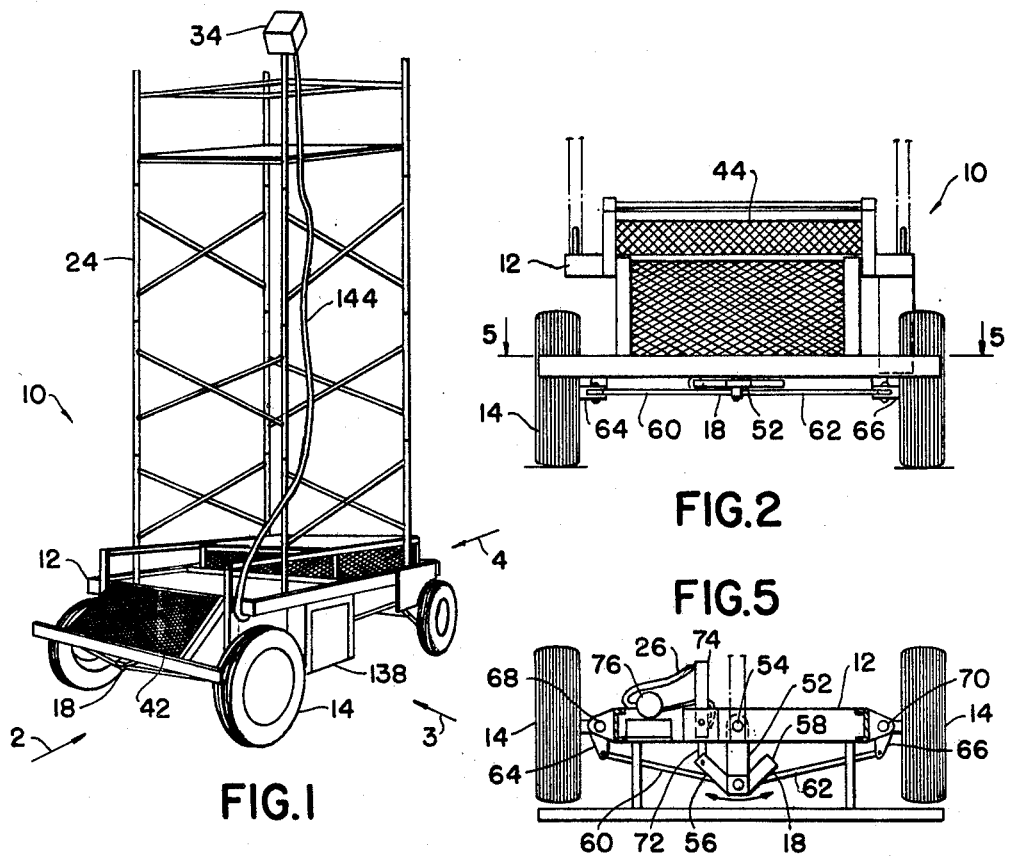
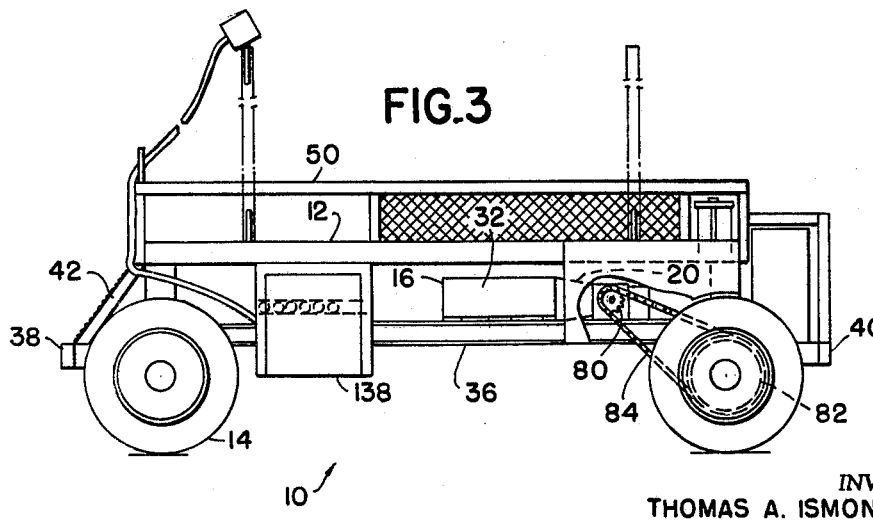
INVENTOR
THOMAS A. ISMOND
BY Whittemore,
Hulbert & Belknap
ATTORNEYS March 24, 1970     T. A. ISMOND     3,502,172

SCAFFOLD VEHICLE

Filed Nov. 13, 1967     4 Sheets-Sheet 2

INVENTOR
THOMAS A. ISMOND

BY *Whittemore, Hulbert & Belknap*

ATTORNEYS

United States Patent Office 3,502,172
Patented Mar. 24, 1970

3,502,172
SCAFFOLD VEHICLE
Thomas A. Ismond, Dearborn, Mich., assignor to W. D. Gale, Inc., Detroit, Mich., a corporation of Michigan
Filed Nov. 13, 1967, Ser. No. 682,389
Int. Cl. E04g 1/18, 3/10, 3/16
U.S. Cl. 182—16                                    14 Claims

ABSTRACT OF THE DISCLOSURE

A motor driven scaffold carrying vehicle for servicing expressway signs and the like including a motor, steering transmission and braking structure; steering, shifting and braking means operably connected to the steering, transmission and braking structure for steering the scaffold vehicle, shifting the transmission structure to drive the vehicle forward and backward and braking the vehicle, and a control circuit for the steering, shifting and braking means whereby the steering, shifting and braking means may be remotely operated along with remote control of the starting and speed of the motor and other vehicle control functions.

The steering, shifting and braking means each includes a hydraulic pump for actuating a hydraulic piston and cylinder structure. A separate solenoid actuated valve is provided in conjunction with the hydraulic pump and piston and cylinder structure to prevent leakage therefrom in the braking and shifting means. The control circuit includes means for preventing an increase in motor speed with the braking structure set or releasing the brakes with the motor at high speed and means for choking the motor operable only when the motor starter is energized.

A unique piston and cylinder structure is provided in the shifting means whereby shifting of the transmission is accomplished with only a predetermined force.

BACKGROUND OF THE INVENTION

Field of the invention

The invention relates to vehicles and refers more specifically to a motor driven scaffold carrying vehicle having means for remote control of the steering, shifting, braking and speed of the vehicle from the top of the scaffold.

Description of the prior art

In the past various types of ladders and scaffolds of a primarily fixed but portable nature have been used to service signs, paint bridges and the like along expressways where the servicing to be done is often spaced considerable distances apart. Such structure to place the workmen at the proper height necessitates climbing up and down and repositioning the ladder or scaffolding even to accomplish service in the same general area. Where servicing is to be accomplished at spaced apart locations the ladder or scaffolding must be taken down, disassembled, placed aboard a vehicle, moved to the new location and reassembled. Such operations are not economical of workmen's time or the time of the transporting vehicles involved.

Alternatively some special purpose trucks have been developed which include a cab from which the driving of the vehicle is accomplished and which also include a crane or the like operable from within the cab to hoist workmen to a working height in a bucket or other movable member on the crane. Such prior vehicles have been deficient in that they require a plurality of personnel to operate. Thus, the usual minimum is two people, one workman and one vehicle operator in the cab of the vehicle. Alternatively the workman has to climb up and down from his working position in the bucket or the like each time a change of his position is required.

SUMMARY OF THE INVENTION

In accordance with the present invention a vehicle is provided which may be operated from the top of a scaffold which is an integral part of the vehicle.

The scaffold carrying vehicle includes separate steering, transmission and braking structure and separate hydraulic cylinder and piston and hydraulic pump means for actuating the steering, transmission and braking structure and a control circuit for controlling the operation of the separate hydraulic means. A separate solenoid actuated valve is provided in the separate means for actuating the transmission and braking structure to prevent leakage of hydraulic fluid from the piston and cylinder through the pump thereof. Also, the control circuit includes means for preventing increased vehicle motor speed with the brakes set or releasing the brakes with the motor at high speed and means for choking the motor only during the starting of the vehicle.

A special piston and cylinder structure is provided in the shifting means for applying limited shifting pressure to the transmission structure regardless of the pressure applied to the piston and cylinder structure.

BRIEF DESCRIPTION OF THE DRAWINGS

FIGURE 1 is a perspective view of a scaffold vehicle constructed in accordance with the invention.

FIGURE 2 is an enlarged front elevation of the scaffold vehicle illustrated in FIGURE 1, taken in the direction of arrow 2 in FIGURE 1, with the scaffold removed therefrom.

FIGURE 3 is an enlarged side elevation view of the scaffold vehicle illustrated in FIGURE 1, taken in the direction of arrow 3 in FIGURE 1, with the scaffold removed therefrom.

FIGURE 5 is a partial section view of the scaffold vehicle illustrated in FIGURE 1, taken substantially on the line 5—5 in FIGURE 2.

DESCRIPTION OF THE PREFERRED EMBODIMENTS

Figure 6:
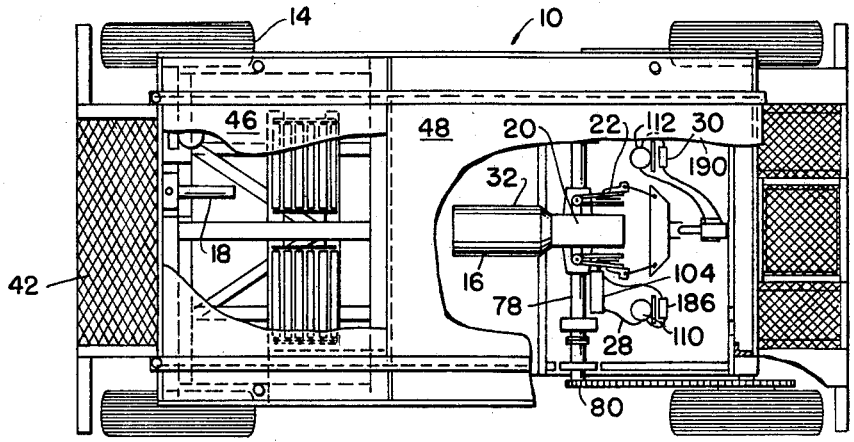
FIGURE 6 is an enlarged top view of the scaffold vehicle illustrated in FIGURE 1 with the scaffold removed and a part of the deck broken away.

The scaffold vehicle 10, illustrated in FIGURE 1, includes a chassis 12, wheels 14 rotatably secured to the chassis 12, drive means 16 for driving some of the wheels 14 to move the vehicle 10, steering structure 18 for steering the vehicle 10, transmission structure 20 and brake structure 22 for shifting between forward and reverse driving of and for stopping of the vehicle. The scaffold 24 is carried by the chassis 12 to provide a work platform.

The steering structure 18, transmission structure 20 and brake structure 22 are controlled by piston and cylinder actuating means 26, 28 and 30, respectively. The speed of the drive means 16 and the piston and cylinder actuating means 26, 28 and 30 are remotely controlled from the top of the scaffold 24 through the control box 34. Thus steering, setting or releasing of the brake, forward or reverse movement of the vehicle 10 and speed control therefor may be accomplished from the top of the vehicle. A single workman may therefore move from place to place for servicing expressway signs or the like without the necessity of climbing up and down the scaffold 24 or taking the scaffold 24 down and no additional workman for driving the vehicle is required.

More specifically the chassis 12 includes a structural frame 36 on which the drive means, which may include either an electric motor or a gasoline motor, wheels 14, steering structure 18 and the transmission and braking structures 20 and 22 are mounted. Bumpers 38 and 40 and screens 42 and 44 are provided on the chassis 12 to protect the vehicle 10 and the components thereof. Wooden deck members 46 and 48 are secured in the frame 36. The deck member 48 is slidable horizontally in grooves in frame members 50 to expose the drive means 16, transmission and braking structures 20 and 22 and the actuating means 28 and 30 therefor.

As shown best in FIGURE 5, the steering structure 18 includes a tongue member 52 secured to the chassis 12 by pivot means 54 and abutment members 56 and 58 rigidly secured to the tongue 52. The steering structure 18 further includes the steering rods 60 and 62 pivotally connected at their adjacent inner ends of the tongue 52 and pivotally connected at their outer ends to one end of the bell cranks 64 and 66. The bell cranks 64 and 66 are pivoted to the chassis 12 by the pivot structures 68 and 70, respectively, while the wheels 14 at the front of the vehicle 10 are secured to the other ends of the bell cranks 64 and 66.

Thus, on movement of the tongue 52 through forty-five degrees either way from the center position illustrated in FIGURE 5, the wheels 14 will turn forty-five degrees to provide steering for the vehicle 10. With the tongue 52 at forty-five degrees in either direction from the position shown, either the abutment member 56 or the abutment member 58 will engage the chassis 12 to prevent further angular displacement of the wheels 14. The tongue 52 is moved about the pivot means 54 on linear movement of the piston rod 72 into or out of the piston and cylinder structure 74 which is pivoted to the chassis 12, as shown in FIGURE 5. The piston and cylinder structure 74 is driven with hydraulic fluid on operation of the reversible pump 76, as will be considered subsequently.

Figures 4, 7:
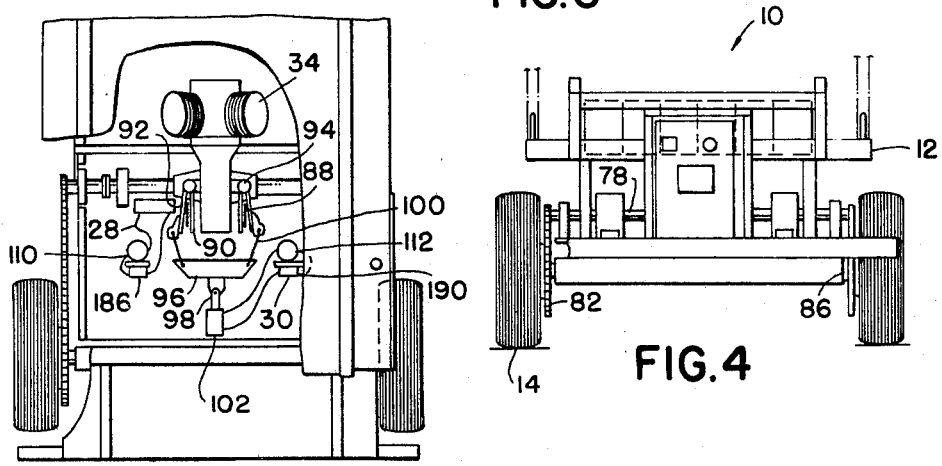
FIGURE 4 is an enlarged rear elevation view of the scaffold vehicle illustrated in FIGURE 1, taken in the direction of arrow 4 in FIGURE 1, with the scaffold removed therefrom.
FIGURE 7 is a partial plan view of a modification of the scaffold vehicle similar to FIGURE 6 with the scaffold removed and a portion of the deck broken away.

The drive means 16, as set forth above, may include either the electric motor 32 or the gasoline motor 34 illustrated in FIGURES 6 and 7, and further includes a transaxle transmission structure 78 (including shifting structure 20), sprocket 80, sprocket 82 and the chain drive 84 between the sprockets 80 and 82 connected to rotate the axle structure 86, whereby the rear wheels 14 of the vehicle 10 are driven.

The drive means 16 is reversible, as indicated above. Further, in the case of the electric motor 32, means are provided in the control circuit of FIGURE 9 for slow, medium and fast drive speeds. In conjunction with the gasoline motor 34, illustrated in the modification of FIGURE 7, a continually variable throttle speed control is provided along with means for preventing an increase in motor speed with the brake structure 22 of the vehicle 10 actuated.

Both the motors 32 and 34 are purchased items and will not be considered in detail herein. Similarly, the transaxle 78 including transmission structure 20 is purchased and will not be considered in detail herein. The transmission structure is such that on axial movement of a piston rod, the drive of the motors 32 and 34 with respect to the rear wheels 14 of the vehicle 10 will be reversed.

Brake structure 22 includes the brake discs 88 connected to the transaxle 78 for rotation therewith and positioned between the fixed plate 90 and the plate 92 pivoted at the pivot structure 94. The brake structure 22 further includes the yoke 96 connected to the piston rod 98 centrally and to the movable plates 92 by means of the cables 100.

Thus, in operation, on actuation of the piston and cylinder structure 102 of the brake structure actuating means 30 to move the piston rod 98 into the cylinder 102, the yoke 96 is drawn toward the piston and cylinder structure 102 and the movable plates 92 are pivoted inwardly toward the fixed plates 90 to grip the brake discs 88 therebetween and stop the rotation of the brake discs and the transaxles 78 secured thereto.

As set forth above, each of the actuating asemblies for the steering structure, shifting structure and brake structure includes a piston and cylinder structure 74, 108 and 102 and a hydraulic pump 76, 110 and 112. In addition, the actuating means 28 and 30 for the shifting structure 20 and the brake structure 22 include a solenoid operated valve in series with the respective pumps and piston and cylinder structures to prevent leaking of hydraulic fluid from the respective piston and cylinder structures through the respective pump structures.

Figure 8:
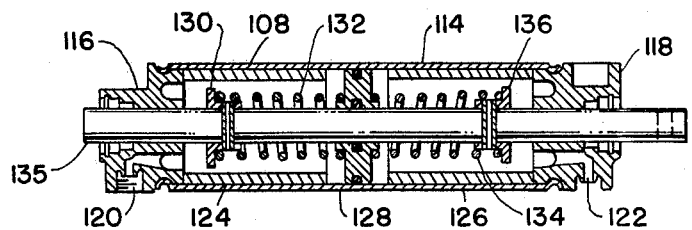
FIGURE 8 is a longitudinal section view of a special piston and cylinder structure for use in the shifting means of the scaffold vehicle illustrated in FIGURES 1 through 7.

The piston and cylinder structures 104, best shown in FIGURE 8, are actuated to move the piston rod 110 toward or away from the transmission structure 20 to cause rotation of the transaxles 78 in opposite directions as desired. The particular piston and cylinder structure illustrated in FIGURE 8 is used in conjunction with the transmission structure 20 to limit the force applied by the piston rod 110 to the transmission structure 20 regardless of the hydraulic actuating force applied to the piston and cylinder structure 108.

The piston and cylinder structure 108 includes the outer cylinder 114, the end members 116 and 118 through which the double ended piston rod 135 extends and which include the openings 120 and 122 through which actuating fluid from the pump 110 is circulated in opposite directions in accordance with the direction it is desired to drive the piston rod 135. Abutment sleeves 124 and 126 are provided within the outer cylinder 114 and provide positive stops for movement of the piston 128 in opposite directions within the outer cylinder 114. The collars 130 secured on the piston rod 135 in a fixed position axially thereof and the springs 132 and 134 extending between the piston 128 and the collars 130 and 136 provide the actuating force for moving the piston rod 135 in either direction uniformly regardless of the pressure applied within the cylinder 114 through the openings 120 or 122.

Figure 9:
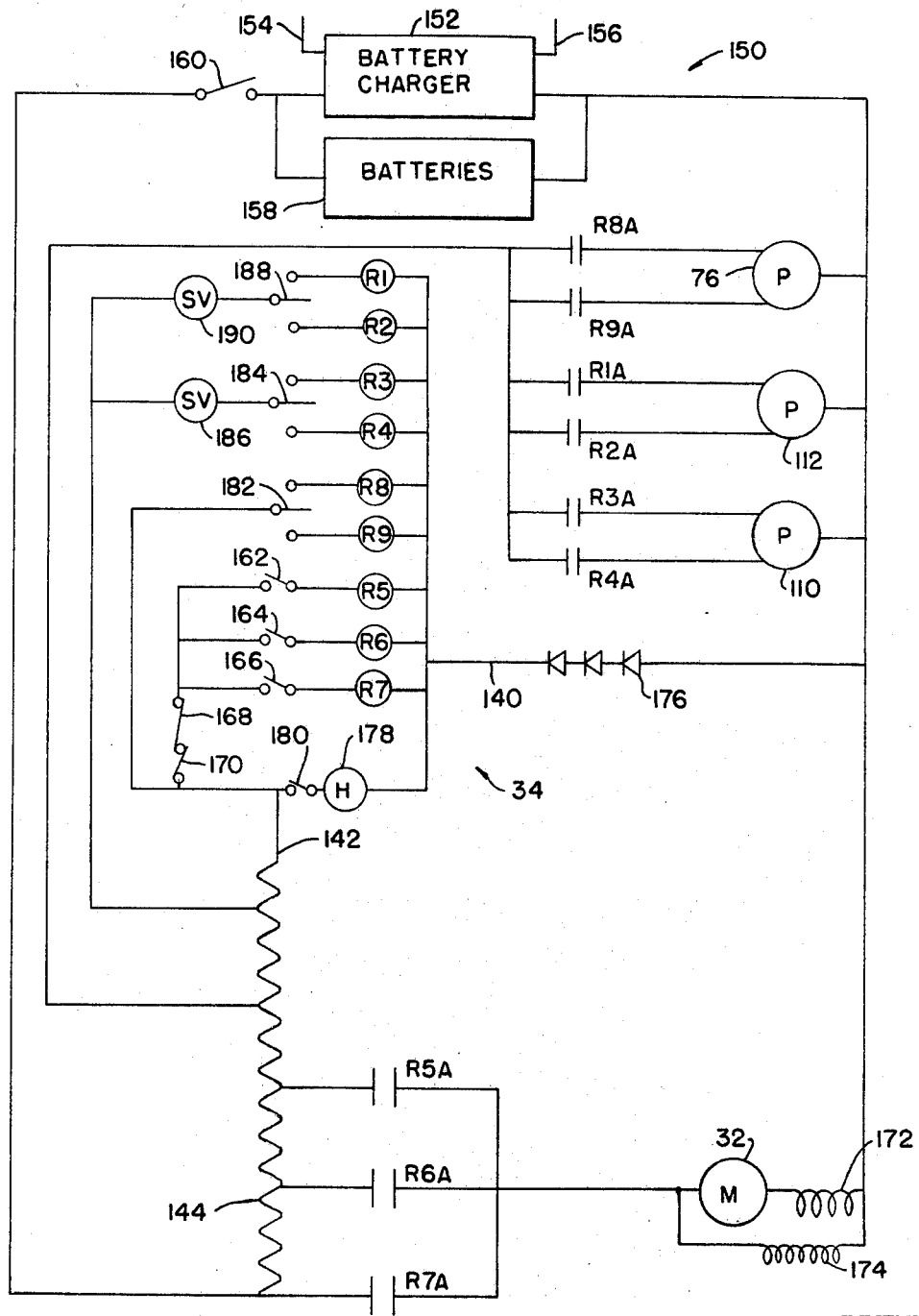
FIGURE 9 is a control circuit for use with the scaffold vehicle illustrated in FIGURES 1 through 6.
Figure 10:
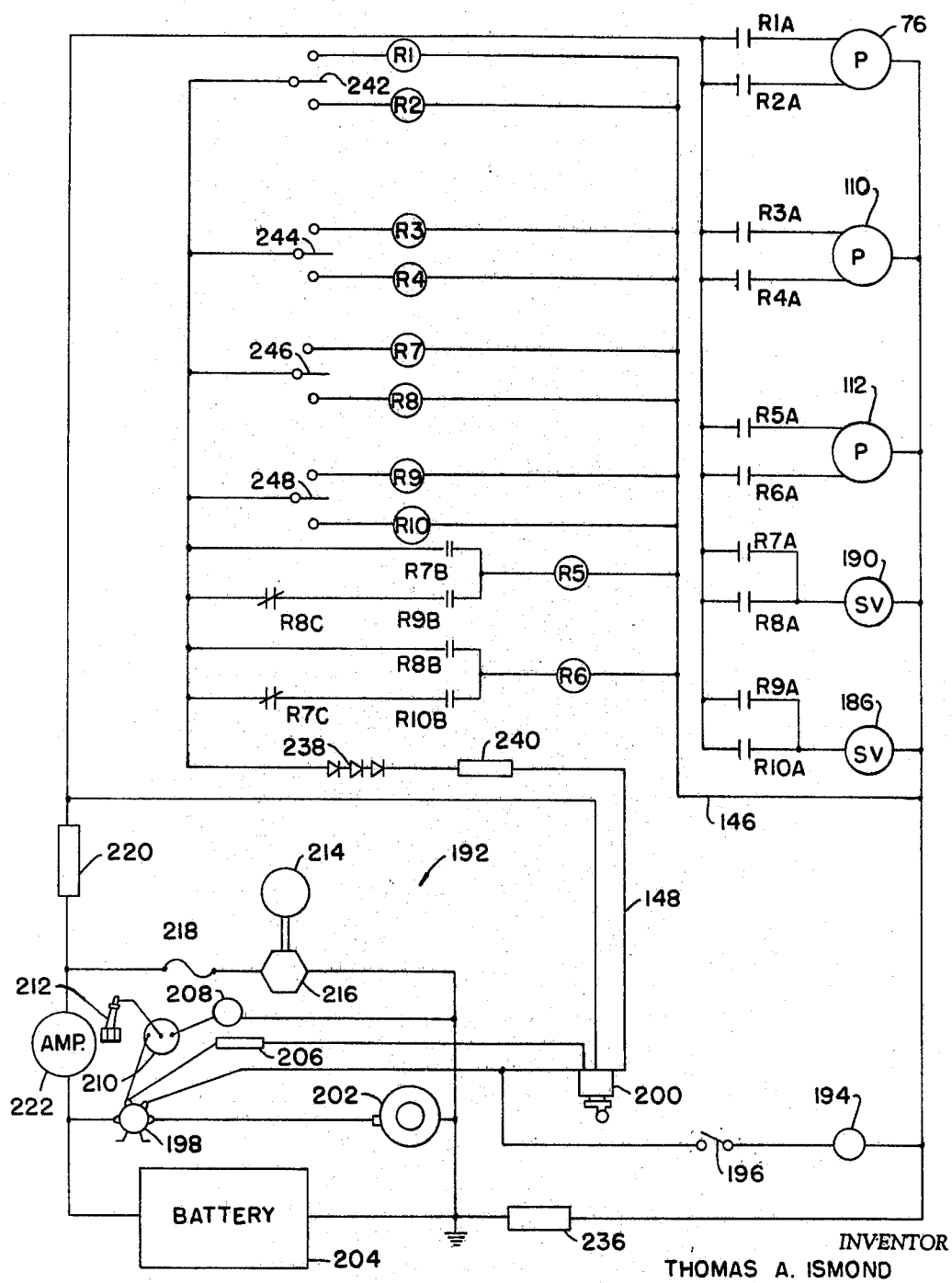
FIGURE 10 is a control circuit for use with the scaffold vehicle illustrated in FIGURE 7.

The overall operation of the scaffold vehicle 10 will now be considered in conjunction with the electrical circuits illustrated in FIGURES 9 and 10. The components of the circuit of FIGURE 9 are secured on the chassis 12 beneath the deck 46 or are in component boxes, such as the box 138 secured to the chassis 12, as will be understood by those in the art. In the case of the control circuit of FIGURE 9, only two conductors 140 and 142 are required in the cable 144 extending to the control box 34 from the chassis 12. Similarly, in the control circuit of FIGURE 10, the conductors 146 and 148 are required in the cable 144.

Referring now specifically to FIGURE 9, the control circuit 150 includes the battery charger 152 which may be plugged into a source of alternating electrical energy through the conductors 154 and 156 when the vehicle 10 is not in use to charge the batteries 158. Batteries 158 provide the energy for operating the vehicle 10 with the electric motor 32.

When it is desired to operate the vehicle 10, the switch 160 is closed. A workman handling the control box 34, if he desires to energize the motor 32 to provide slow, medium or fast speed, will close one of the switches 162, 164 or 166 which are normally spring loaded in the open position to energize a relay coil R–5, R–6 or R–7 from the right side of the batteries 158 through the diodes 176 in conductor 140, limit switch 168 and emergency switch 170, conductor 142 and carbon pile resistor 144 back to the left side of batteries 158. The relay coils R–5, R–6 and R–7 when energized will cause closing of the relay contacts R–5A, R–6A and R–7A, respectively, whereby the motor 32 which, as shown, is a compound wound motor having both a series winding 172 and a shut winding 174 through different portions of the carbon pile resistor 144 or in the case of fast speed through no portion of the carbon pile resistor 144.

The diodes 176 are provided in the energizing circuits for the relay coils R–1 through R–7 to limit sparking in the switch contacts, as will be understood by those in the art.

The limit switch 168 is on the brake setting piston rod 98 to prevent energizing of the motor 32 with the brakes set. The emergency switch 170 is provided on the control box 34 in case the limit switch 168 should fail.

A horn circuit, including the horn 178 and the normally open switch 180 is provided in parallel with the slow, medium and fast switches 162, 164 and 166, as shown, to permit remote horn operation as desired.

When it is desired to steer the vehicle 10 right or left, the switch 182 which is normally biased in the central open position shown, is moved upward to energize relay coil R–8 for right steering or down, as shown in FIGURE 9, for left steering to energize relay coil R–9. Energizing of relay coils R–8 and R–9 closes contacts R–8A and R–9A, respectively, to energize the steering pump 76 in opposite directions from the right side of the batteries 158 through the pump 76, contacts 8 or 9, a portion of the resistor 144 and back to the left side of the batteries 158.

When it is desired to shift, that is, to change the vehicle between forward and reverse operation, the switch 184 is moved up to energize the relay coil R–3 for forward operation and is moved down to energize the relay coil R–4 for reverse operation from its central biased position, as shown in FIGURE 9. On upward or downward movement of the switch 184, the contacts R–3A or R–4A, respectively, are closed to energize the pump 110 in opposite directions, whereby the piston rod 135 in the piston and cylinder structure 108 will be moved in opposite directions.

In addition, when the switch 184 is moved in an up or a down direction to energize relay coil R–3 or relay coil R–4, the solenoid valve 186 is also energized whereby fluid flow between the pump 110 and the piston and cylinder structure 108 is permitted. With the momentary contact switch 184 in its centrally biased position, as shown in FIGURE 9, the solenoid valve 186 is not energized and is therefore closed. Thus the hydraulic fluid in the closed series circuit, including the piston and cylinder structure 108, the pump 110, and the solenoid valve 186 is prevented from leaking from one end of the cylinder 108 to the other through the pump 110.

Similarly, when it is desired to set the brakes, the momentary contact switch 188 is moved in an up direction to energize the relay coil R–1 and close the contacts R–1A to actuate the pump 112 in one direction while energizing the solenoid valve 190. Releasing the brake structure 22 is accomplished by moving the momentary contact switch 184 down to energize the relay coil R–2 to close the contacts R–2A and to energize the solenoid valve 190 as before.

The operation of the modified scaffold vehicle structure 10 with the gasoline engine 34 is accomplished with the control circuit of FIGURE 10, wherein the hydraulic pumps and solenoid operated valves have been given the same reference characters as in the control circuit of FIGURE 9. In the control circuit of FIGURE 10, the gasoline engine ignition circuit 192 is conventional and will therefore not be considered in detail, except for the choke soleniod 194 used in conjunction therewith.

The choke solenoid 194 is energized to actuate a choke on the motor 34 any time the momentary contact switch 196 is closed and the starter solenoid 198 of the ignition circuit 192 is energized.

The ignition circuit 192 includes the ignition switch 200, starter 202, battery 204, resistor 206, distributor points 208, ignition coil 210, spark plugs 212 and alternator 214 connected to the rectifier 216. The fuse 218, resistor 220 and an ammeter 222 are also provided in conjunction with the ignition circuit.

The hydraulic pumps 76, 110 and 112 are provided in control circuit 10 for steering, shifting and the combined function of braking and throttle positioning, respectively, and are similar to pumps 76, 110 and 112, respectively, which are associated with the electric motor 32 as illustrated in FIGURE 9. The solenoid operated valves 190 and 186 are similar to valves 186 and 190 of FIGURE 9.

Pumps 76, 110 and 112 and valves 232 and 234 are connected across the battery 204 through the circuit breaker 236 and the resistance 220 and ammeter 222 when appropriate relay contacts R–1A through R–10A are closed, as will be considered subsequently. Similarly the relay coils R–1 through R–10 are connected to the opposite sides of the battery 204 through the circuit breaker 236, the rectifiers 238, resistor 240 and ignition circuit 192 when the switch 200 is closed, and the appropriate momentary contact switches 242, 244, 246 and 248 are closed.

Thus, in operation of the modified control circuit of FIGURE 10, the gasoline engine 34 is started by means of the ignition circuit 132 in the usual manner. When it is desired to steer right or left, the momentary contact switch 242 is placed in an up for right or a down for left position to close the contacts R–1A or R–2A to provide hydraulic fluid through the pump 76 in opposite directions.

When it is desired to shift between forward and reverse drive of the vehicle 10, the momentary contact switch 244 is moved up or down, respectively, to energize the relay coils R–3 or R–4 and thus close relay contacts R–3A or R–4A to provide hydraulic fluid through the pump 110 in opposite directions.

The operation of the brakes and throttle of the vehicle 10 with the control circuit illustrated in FIGURE 10 are inter-related. Thus, when the relay contacts R–5A are closed, the pump 112 will pump hydraulic fluid in a direction to set the brakes and close the throttle. Conversely, when the relay contacts R–6A are closed, the brakes are released and the throttle may be opened. At the same time, in order to actuate the brakes and the throttle, the brake solenoid valve 190 must be opened and the throttle solenoid valve 186 must be opened respectively.

Thus, when the momentary contact switch 246 is placed in an up position, the relay coil R–7 is energized to close the contacts R–7A and R–7B and open the contacts R–7C. The closing of the contacts R–7B energizes relay coil R–5 to closed contacts R–5A and drive the pump 112 in a direction to set the brakes. The closing of the contacts R–7A causes the solenoid valve 190 to open so that the hydraulic fluid goes from the pump 112 to the associated cylinder. Opening of the contacts R–7C prevents energizing of the relay coil R–6, even though the relay coil R–10 is energized to prevent an attempt to open the throttle with the brakes set.

Movement of the switch 246 into the lower position therefor will energize the relay coil R–8 to close the relay contacts R–8A and R–8B and open relay contacts R–8C. Closing the relay contacts R–8B energizes the relay coil R–6 to close the contacts R–6A and drive the motor 112 in a direction to release the brake and open the throttle. Closing the contacts R–8A energizes the solenoid valve 190, whereby the brakes can be released, while opening the relay contacts R–8C prevents energizing the relay coil R–5 when the relay coil R-9 is energized. Thus releasing the brakes with the throttle open is prevented.

Movement of the momentary switch 248 up energizes the relay coil R-9 to close the contacts R-9A and R-9B. Closing the contacts R-9B with the relay coil R-8 not energized will energize the relay coil R-5 to drive the pump 112 in a direction to close the throttle. Closing the contacts R-9A energizes the solenoid operated valve 186, associated with the throttle, allowing the throttle to be closed at this time.

Similarly on movement of the momentary switch 248 down, the relay coil R-10 is energized to close the contacts R-10A and R-10B. Similarly closing the contacts R-10B will cause energizing of the relay coil R-6 when the relay coil R-7 is not energized and consequent driving of the pump 112 due to the closing of contacts R-6A in a direction to open the throttle. The contacts R-10A will close, permitting the opening of the throttle since the solenoid valve 186 will be energized at this time.

Thus, it will be seen that in the circuit of FIGURE 10 there is provided a safety feature which prevents an attempt to either open the throttle with the brakes on or release the brakes with the throttle open.

While one embodiment of the invention and a modification thereof have been disclosed in detail, it will be understood that other embodiments and modifications are contemplated by the inventor. Therefore, it is the intention to include all modifications and embodiments of the invention as are defined by the appended claims within the scope of the invention.

What I claim as my invention is:

1. A motor driven scaffold vehicle comprising a chassis, wheels secured to the chassis for movement of the chassis on driving of the wheels, motor means carried by the chassis for driving at least some of the wheels, shifting means operably associated with the motor means for causing forward or reverse driving of the wheels by the motor means, steering means secured to the chassis for steering at least some of the wheels, brake means associated with at least some of the wheels, said shifting, steering and braking means each including a hydraulic pump and a piston and cylinder structure operable on actuation of the hydraulic pump for effecting the shifting, steering and braking and said steering means including steering bell-cranks pivotally connected to the chassis, one end of which is connected to wheels to be steered, the other end of the bell-cranks being connected to connecting rods, a pivotally connected tongue member, means connecting the connecting rod to the tongue member, abutment members extending at 45° from and secured to the tongue member, means pivotally mounting the steering piston and cylinder structure and means pivotally connecting the steering piston and cylinder structure to one end of one of the abutment members, a scaffold secured to the chassis and control means for effecting at least some of the driving, shifting, steering and braking of the vehicle from the scaffold.

2. A motor driven scaffold vehicle comprising a chassis, wheels secured to the chassis for movement of the chassis on driving of the wheels, motor means carried by the chassis for driving at least some of the wheels, shifting means operably associated with the motor means for causing forward or reverse driving of the wheels by the motor means, steering means secured to the chassis for steering at least some of the wheels, brake means associated with at least some of the wheels, said shifting, steering and braking means each including a hydraulic pump and a piston and cylinder structure operable on actuation of the hydraulic pump for effecting the shifting, steering and braking, said braking means and shifting means further including a solenoid valve in series with the pump and piston and cylinder structure for preventing leaking from the piston and cylinder structure on stopping of the pump, a scaffold secured to the chassis and control means for effecting at least some of the driving, shifting, steering and braking of the vehicle from the scaffold.

3. A motor driven scaffold vehicle comprising a chassis, wheels secured to the chassis for movement of the chassis on driving of the wheels, motor means carried by the chassis for driving at least some of the wheels, shifting means operably associated with the motor means for causing forward or reverse driving of the wheels by the motor means, steering means secured to the chassis for steering at least some of the wheels, brake means associated with at least some of the wheels, said shifting, steering and braking means each including a hydraulic pump and a piston and cylinder structure operable on actuation of the hydraulic pump for effecting the shifting, steering and braking and the piston and cylinder structure of the shifting means including an outer cylinder, end members over the ends of the outer cylinder, a piston rod extending axially through the outer cylinder and end members centrally thereof, abutments within the outer cylinder engageable with the piston for limiting its movement within the outer cylinder, collars secured to the piston rod on each side of the piston and resilient means operable between the collars and piston whereby release of the actuating force for the piston and cylinder structure only the force of the resilient means will be applied to cause axial movement between the outer cylinder and piston rod, a scaffold secured to the chassis and control means for effecting at least some of the driving, shifting, steering and braking of the vehicle from the scaffold.

4. A motor driven vehicle comprising a chassis, wheels secured to the chassis for movement of the chassis on driving of the wheels, motor means carried by the chassis for driving at least some of the wheels, steering means secured to the chassis for steering at least some of the wheels, brake means associated with at least some of the wheels and control means for effecting at least some of the driving, steering and braking of the vehicle including means for preventing release of the braking means with the motor at high speed.

5. A motor driven vehicle comprising a chassis, wheels secured to the chassis for movement of the chassis on driving of the wheels, motor means carried by the chassis for driving at least some of the wheels, steering means secured to the chassis for steering at least some of the wheels, brake means associated with at least some of the wheels and control means for effecting at least some of the driving, steering and braking of the vehicle including means for preventing an increase in motor speed with the brake means actuated.

6. Structure as set forth in claim 5, wherein the control means further includes means for preventing release of the brake means with the motor at high speed.

7. A motor driven scaffold vehicle comprising a chassis, wheels secured to the chassis for movement of the chassis on driving of the wheels, motor means carried by the chassis for driving at least some of the wheels, shifting means operably associated with the motor means for causing forward or reverse driving of the wheels by the motor means, steering means secured to the chassis for steering at least some of the wheels, brake means associated with at least some of the wheels, a scaffold secured to the chassis and control means for effecting at least some of the driving, shifting, steering and braking of the vehicle from the scaffold including means for preventing increase in motor speed with the brake means actuated and means for preventing release of the brake means with the motor at high speed.

8. Structure as set forth in claim 7 wherein the motor means is electric.

9. Structure as set forth in claim 7 wherein the motor means is gasoline and includes a starter.

10. Structure as set forth in claim 9 wherein choke means are included in the motor means operable only when the starter is energized.

11. Structure as set forth in claim 7 wherein the shifting, steering and braking means each includes a hydraulic pump and a piston and cylinder structure operable on actuation of the hydraulic pump for effecting the shifting, steering and braking.

12. Structure as set forth in claim 11 wherein the steering means includes steering bell-cranks pivotally connected to the chassis, one end of which is connected to wheels to be steered, the other end of the bell-cranks being connected to connecting rods, a pivotally connected tongue member, means connecting the connecting rod to the tongue member, abutment members extending at 45° from and secured to the tongue member, means pivotally mounting the steering piston and cylinder structure and means pivotally connecting the steering piston and cylinder structure to one end of one of the abutment members.

13. Structure as set forth in claim 11 wherein the braking means and shifting means further include a solenoid valve in series with the pump and piston and cylinder structure for preventing leaking from the piston and cylinder structure on stopping of the pump.

14. Structure as set forth in claim 11 wherein the piston and cylinder structure of the shifting means includes an outer cylinder, end members over the ends of the outer cylinder, a piston rod extending axially through the outer cylinder and end members centrally thereof, a piston secured to the piston rod centrally thereof, abutments within the outer cylinder engageable with the piston for limiting its movement within the outer cylinder, collars secured to the piston rod on each side of the piston and resilient means operable between the collars and piston whereby regardless of the actuating force for the piston and cylinder structure only the force of the resilient means will be applied to cause axial movement between the outer cylinder and piston rod.

References Cited

UNITED STATES PATENTS

| | | | |
|---|---|---|---|
| 2,480,801 | 8/1949 | Wilson | 92—84 |
| 2,998,861 | 9/1961 | Hotchkiss | 182—82 |
| 3,043,395 | 7/1962 | Volkel | 182—2 |
| 3,095,945 | 7/1963 | Mitchell | 182—16 |
| 3,332,513 | 7/1967 | Wiebe | 182—16 |
| 3,344,885 | 10/1967 | Rasmussen | 182—16 |

REINALDO P. MACHADO, Primary Examiner

U.S. Cl. X.R.

180—79.2; 182—148, 63